Jan. 22, 1924.
A. SILVENE
TIRE TREAD
Filed Dec. 23, 1922
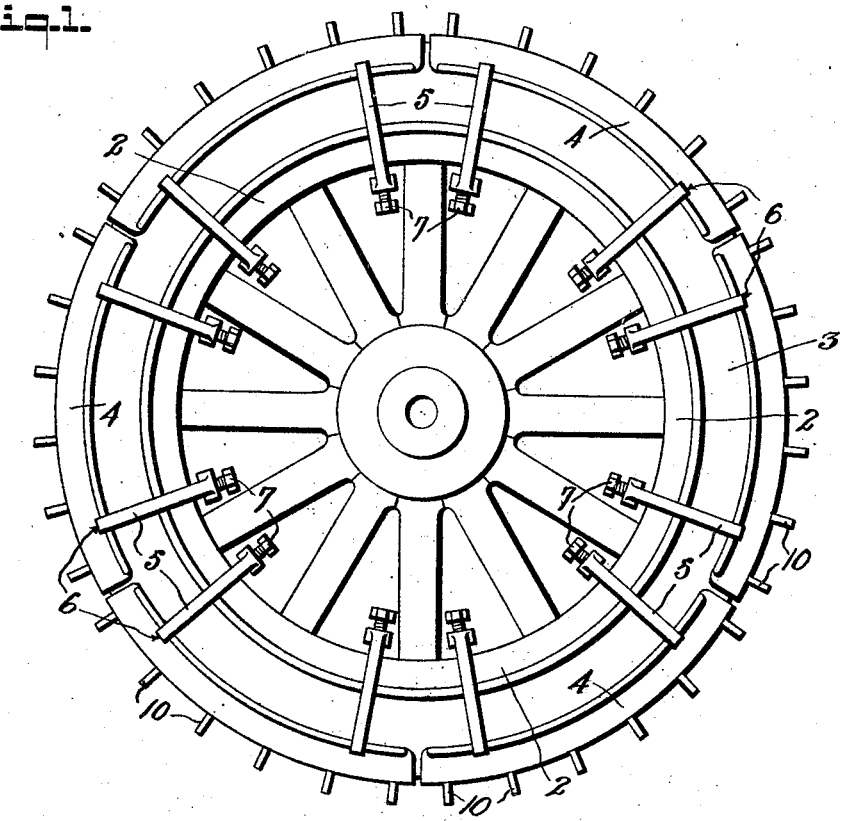
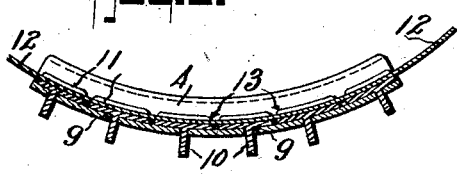
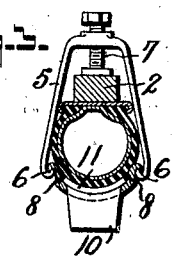
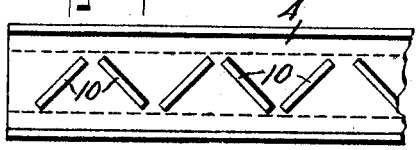
Inventor
Antony Silvene.
By Fred G. Dieterich
Attorneys Patented Jan. 22, 1924.

1,481,440

UNITED STATES PATENT OFFICE.

ANTONY SILVENE, OF VICTORIA, BRITISH COLUMBIA, CANADA.

TIRE TREAD.

Application filed December 23, 1922. Serial No. 608,644.

*To all whom it may concern:*

Be it known that I, ANTONY SILVENE, citizen of the Dominion of Canada, residing at Victoria, in the Province of British Columbia, Canada, have invented certain new and useful Improvements in Tire Treads, of which the following is a specification.

This invention relates to a tire tread designed for removable attachment to the cover of a pneumatic tire in order to give the tire a more effective hold on the road when the same is of relatively soft material or ascends a heavy incline.

The device comprises segments pressed from thin sheet metal to conform approximately in cross section to the tread of the tire cover, which segments are connected to the felly of the wheel, so as to hold them in close contact with the cover and form a continuous metal casing around its circumference.

Around the tread these casing segments are recessed outward from the tire cover and the recessed portion is transversely apertured at intervals apart to receive radially projecting members, which, within the casing, have an enlarged contact with the tire cover.

The invention is particularly described in the following specification, reference being made to the drawings by which it is accompanied, in which:

Fig. 1 is a side elevation of a wheel having my improved tire tread.

Fig. 2 is a longitudinal section of a portion thereof to an enlarged scale and showing a modification of the invention.

Fig. 3 is a cross section of the tire and the tread and

Fig. 4, a face view of the same.

In these drawings 2 represents the felly of the wheel and 3 the cover of a pneumatic tire tube.

Segments 4, conforming in cross section to the tread of the tire cover and lengthwise extending through a fraction of its circumference, are connected in any suitable manner to the felly of the wheel, so as to form a continuous protective shield for the cover.

In the drawing the ends of each segment are shown as connected to the felly by stirrup loops 5, which are connected at 6 to the edges of the segment 4 and tightened against the tread of the tire cover by screws 7 threaded through a boss formed in the stirrup, which screws bear on the inner side of the felly 2.

These shield segments 4 are outwardly recessed from the immediate tread of the tire cover, as at 8, and are transversely apertured, as at 9, across the width of this tread recess. The adjacent apertures 9 are preferably oppositely angled from one another for a reason which will be explained later.

Through these apertures 9 members 10 radially project, which members have T-heads 11 which fit within the recess of the segment and provide a broad surface contact on the tire cover, or on a metal lining strip 12 between them and the tire cover where such is considered necessary.

In use, the projections 10 will engage the surface of the roadway and will ensure an effective driving hold thereon, without seriously interfering with the free pneumatic action of the tire, as the projecting members 10, where they contact with the roadway, yield inward against the pneumatic resistance of the tire tube.

The portions 11 forming the heads of the tees within the recess 8 of the casing 4 are close to one another, just a sufficient distance apart to prevent nipping the material of the tire cover 4 between their edges, and the corners are carefully rounded, as at 13, to avoid injury to the cover.

The device as described may be applied to the wheels of trucks or heavy vehicles to be in continuous use where such trucks are working over soft roads or heavy grades, or they may be kept on the vehicle, and one or more of the segments may be applied to such of the wheels as may have got into a soft part of the road, where the ordinary tire has no hold, in order to extricate the vehicle from such position, and may thereafter be removed.

The device is simple and effective and necessitates no modification of the existing structure of the wheel and tire to which it is applied.

I do not desire to be confined to the particular manner of attachment to the wheel as illustrated and described in the foregoing specification as the same may be modified in adapting it to wheels of a different kind.

Having now particularly described my invention, I hereby declare that what I claim as new and desire to be protected in by Letters Patent, is:

1. A tire tread comprising a casing segment adapted to fit the tire and having a recessed portion facing the tire along the tread, the recessed portion having apertures across the tread which are alternately oppositely angled, separate road engaging members flanged to fit the recess of the casing segment and provide a practically continuous contact around the tire, each member having a projection which passes through an aperture in the recessed portion of the casing segment.

2. A tire tread comprising a casing segment adapted to fit the tire and having a recessed portion facing the tire along the tread, said segment having apertures across the tread which are alternately oppositely angled, separate road engaging members flanged to fit the recess of the casing segment and each having a projection which passes through one of the angled apertures in the casing segment, the outer edges of which projections are straight and substantially parallel to the plane of the road surface, and means for securing the casing segment to the felly of the wheel.

In testimony whereof I affix my signature.

ANTONY SILVENE.